US007527211B2

(12) United States Patent
Grabandt

(10) Patent No.: US 7,527,211 B2
(45) Date of Patent: May 5, 2009

(54) FUEL INJECTOR WITH CLAMPING SLEEVE AS A STOP FOR A VALVE NEEDLE

(75) Inventor: Peter Grabandt, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 768 days.

(21) Appl. No.: 11/149,288

(22) Filed: Jun. 10, 2005

(65) Prior Publication Data

US 2005/0274829 A1 Dec. 15, 2005

(30) Foreign Application Priority Data

Jun. 11, 2004 (DE) ....................... 10 2004 028 523

(51) Int. Cl.
*F16K 31/02* (2006.01)

(52) U.S. Cl. ............ 239/533.2; 239/585.3; 251/129.16; 251/903

(58) Field of Classification Search ............ 251/129.15, 251/129.16, 903; 239/585.1, 585.4, 585.5, 239/533.2, 585.3
See application file for complete search history.

(56) References Cited

U.S. PATENT DOCUMENTS

| | | | | |
|---|---|---|---|---|
| 5,301,874 | A * | 4/1994 | Vogt et al. | 239/585.4 |
| 5,360,197 | A * | 11/1994 | Reiter et al. | 251/337 |
| 5,848,613 | A * | 12/1998 | Sakaguchi et al. | 251/129.16 |
| 6,119,966 | A * | 9/2000 | Wagner et al. | 239/585.3 |
| 6,170,767 | B1 * | 1/2001 | Herold et al. | 251/129.15 |
| 6,390,067 | B1 | 5/2002 | Haltiner, Jr. et al. | |
| 6,421,913 | B1 | 7/2002 | Bonnah, II et al. | |
| 6,702,207 | B2 * | 3/2004 | Seelbach et al. | 239/585.1 |
| 6,834,667 | B2 * | 12/2004 | Sumiya et al. | 239/585.1 |
| 2003/0042456 | A1 * | 3/2003 | Makino | 251/129.16 |
| 2003/0102391 | A1 * | 6/2003 | Rodriguez-Amaya et al. | 239/585.1 |
| 2003/0127614 | A1 * | 7/2003 | Haeberer et al. | 251/129.16 |
| 2004/0149838 | A1 * | 8/2004 | Potschin et al. | 239/533.2 |

FOREIGN PATENT DOCUMENTS

| | | | |
|---|---|---|---|
| DE | 101 09 411 | A1 | 9/2002 |
| DE | 102 49 161 | B3 | 1/2004 |
| EP | 1 219 816 | A1 | 7/2002 |
| WO | WO 03058052 | A1 * | 7/2003 |

* cited by examiner

*Primary Examiner*—John Bastianelli
(74) *Attorney, Agent, or Firm*—Ronald E. Greigg

(57) ABSTRACT

A method for producing a fuel injector and a fuel injector for internal combustion engines, having a control valve with an electromagnetically actuatable valve needle; a coil is received in a magnet cup made of magnetizable material. At least one clamping sleeve, with a slot extending between the face ends of the clamping sleeve, is received in the magnet cup.

18 Claims, 5 Drawing Sheets

Fig. 6.1
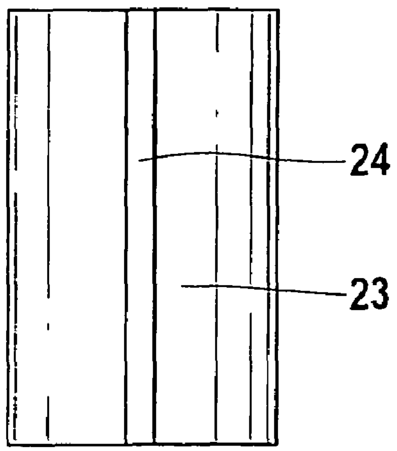
Fig. 6.2
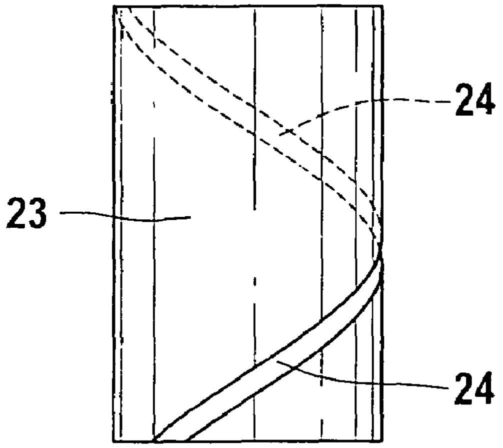
Fig. 6.3
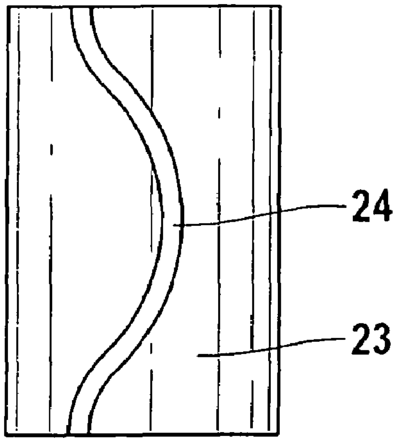

FUEL INJECTOR WITH CLAMPING SLEEVE AS A STOP FOR A VALVE NEEDLE

CROSS-REFERENCE TO RELATED APPLICATIONS

This application is based on German Patent Application 10 2004 028 523.3 filed Jun. 11, 2004, upon which priority is claimed.

BACKGROUND OF THE INVENTION

1. Field of the Invention

This invention relates to an improved fuel injector for internal combustion engines, and to a method of producing the fuel injector.

2. Description of the Prior Art

For supplying fuel to internal combustion engines, fuel injection valves are often used at present. For meeting emissions limits and reducing fuel consumption, the fuel quantity injected into the individual cylinders must be dimensioned precisely. This requires extremely short opening and closing times of the injection valve. Moreover, the valve needle must have the same stroke each time it opens, to assure that the same quantity of fuel will be injected into the cylinder each time. This is attained by means of a stroke limitation.

In the fuel injectors that are available on the market, the limitation of the stroke of the valve needle is done in various ways. For instance, the stroke limitation is realized by using a stop disk, which is struck by the valve needle. The stop disk rests on the magnet cup, so that a direct impact of the valve needle on the magnet cup is avoided. The stroke required for operation of the fuel injector and the remanent air gap are adjusted by grinding protrusions or steps into the valve needle.

Another possible way of attaining the stroke limitation is for the valve needle to strike a sleeve press-fitted into the magnet cup. In this variant, the stroke and the remanent air gap are adjusted by adjusting disks, whose thickness is adapted to the stroke into the remanent air gap.

Another possible way of attaining the stroke limitation is to use a holding-down device with a sleevelike stop that is surrounded by the magnet cup. One such sleevelike stop is known from German Patent Disclosure DE 102 49 161 B3. In it, the stroke is adjusted by an adjusting disk between the valve housing and the holding-down device, and the remanent air gap is adjusted by grinding the sleeve, embodied as a stop, down to the appropriate length.

To avoid eddy currents in the magnet cup, which slow down the switching of the fuel injector, the magnet cup is made from a metal-polymer composite material, as described in Bosch Research Info, 3/2001. To that end, fine iron particles are sheathed in plastic, compacted, and sintered to make a workpiece. However, this material is very brittle and therefore vulnerable to impacts. For this reason, the valve needle must be prevented from striking the magnet cup.

If the valve needle strikes the magnet cup, parts can break off, causing the magnetic properties of the magnet cup to change. The broken-off particles may also cause increased wear and thus lead to the failure of the fuel injector.

OBJECT AND SUMMARY OF THE INVENTION

In the fuel injector embodied according to the invention, which is triggered via a control valve with an electromagnetically actuatable valve needle, and with a coil received in a magnet cup made of magnetizable material, to prevent the valve needle from striking the magnet cup a tubular clamping sleeve with a slot extending between the face ends is received in the magnet cup.

For assembly, the clamping sleeve is prestressed and inserted into a bore, which is located, preferably centered, in the magnet cup. The prestressing creates a spring force in the clamping sleeve, by which the clamping sleeve is pressed against the wall of the bore and is thus held in the magnet cup. The spring force is dimensioned such that the clamping sleeve is not released as a result of the jarring stress occurring during operation or of its own mass. The forces required to expel the clamping sleeve from the magnet cup are preferably in the range from 100 to 500 N. The term “expulsion force” is understood to mean the force required to release the clamping sleeve from the magnet cup.

In a preferred embodiment, the clamping sleeve is made from a nonmagnetizable material. A sleeve of magnetizable material has the disadvantage that even after the delivery of current to the coil ends, the magnetization is preserved, and the valve needle is thus initially kept in the open position by the clamping sleeve and does not close until after a delay. Moreover, the material from which the clamping sleeve is made is preferably not deformable by the impact of the valve needle. A plastic deformation of the clamping sleeve would cause the needle stroke to lengthen over the course of operation of the fuel injector. Lengthening of the needle stroke can for example lead to an increase in the injected fuel quantity and thus to increased fuel consumption. Carbon steel is an example of a suitable material for producing the clamping sleeve.

So that the valve needle will not strike the magnet cup when it opens, the diameter of the stop face of the valve needle is greater than the inner diameter of the tubular clamping sleeve and the outer diameter of the tubular clamping sleeve is preferably greater than or equal to the diameter of the stop face of the valve needle. Because the width of the slot extending between the face ends makes up at most 25% of the sleeve circumference, kinking of the valve needle upon impact is avoided, and precise opening is thus achieved. An annular stop face and hence a uniform impact of the valve needle can be attained by providing that in the magnet cup, at least two clamping sleeves are received, whose slots extending between the face ends are located at different radial positions.

In a further preferred embodiment, the length of the clamping sleeve is equivalent to the height of the magnet cup, so that the face ends of the clamping sleeve and the magnet cup form a smooth surface. This is attained by providing that first, the at least one clamping sleeve is press-fitted into the magnet cup, and then the face ends of the magnet cup, with the clamping sleeve press-fitted inside it, are ground flat. The remanent air gap required so that the armature of the valve needle will not adhere to the magnet cup is attained by providing that the stop face of the valve needle protrudes out of the armature of the valve needle by the height of the remanent air gap.

BRIEF DESCRIPTION OF THE DRAWINGS

The invention will be better understood and further objects and advantages thereof will become more apparent from the ensuing detailed description of preferred embodiments, taken in conjunction with the drawings, in which:

FIGS. 6.1, 6.2 and 6.3 show various versions of the slot extending between the face ends, of the clamping sleeve.

DESCRIPTION OF THE PREFERRED EMBODIMENTS

Figure 1:
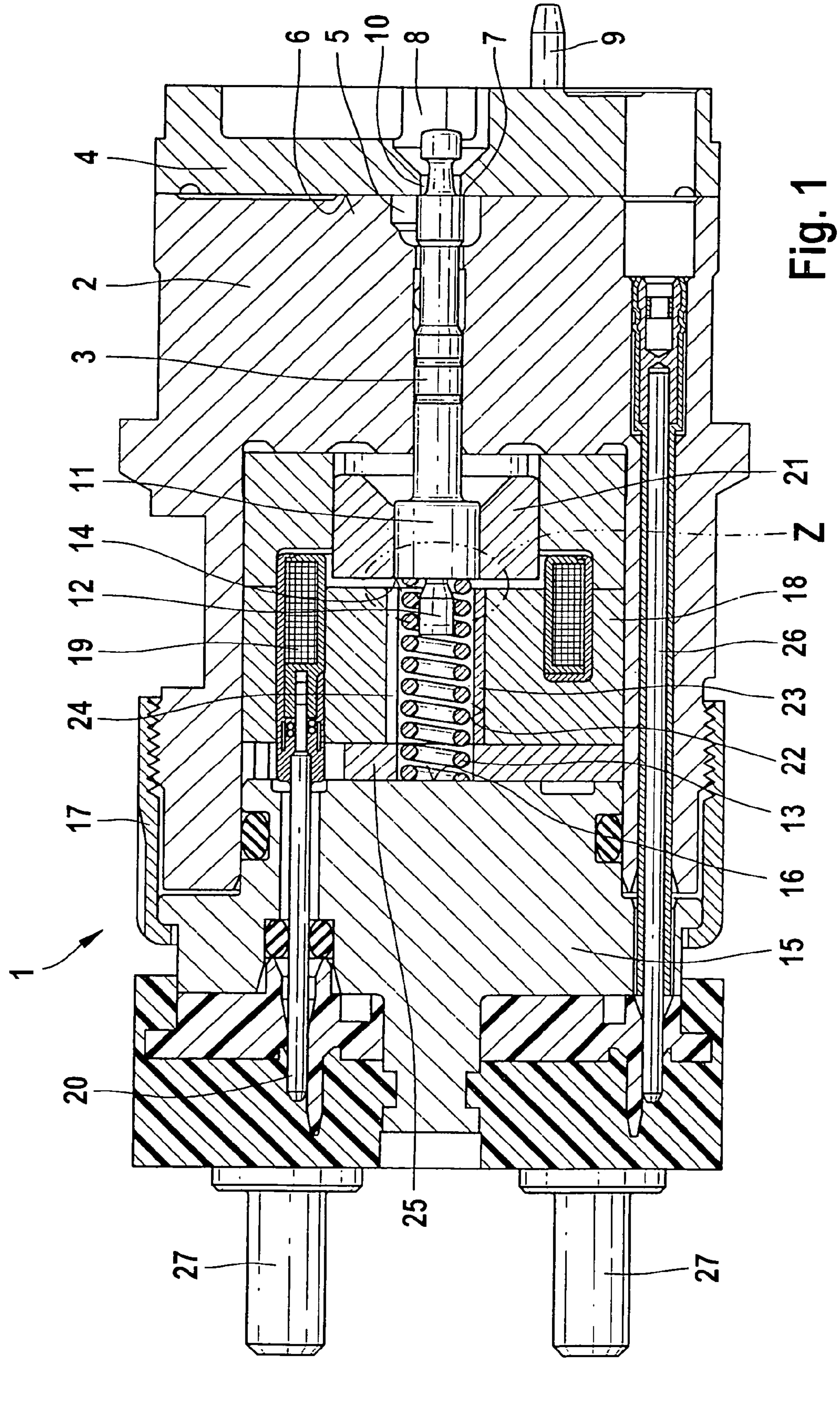
FIG. 1 shows a control valve, embodied according to the invention, of a fuel injector.

FIG. 1 shows a control valve 1 includes a valve body 2, with a bore received centrally in it, in which bore a valve needle 3 is guided. On the side toward an injection valve, not shown here, the valve body 2 is adjoined by a stop plate 4. On the side toward the stop plate 4, the bore in the valve body 2 opens up into a first valve chamber 5. The first valve chamber 5 is defined by an end face 6 of the stop plate 4. The first valve chamber 5 is adjoined by a bore 10 in the stop plate 4. The bore 10 opens into a second valve chamber 8. By means of the flat seat 7 on the valve needle 3, the bore 10 in the stop plate 4 can be opened or closed.

For the sake of installing the injection valve, not shown in FIG. 1, in the correct position on the control valve 1, a guide peg 9 is embodied on the stop plate 4. For assembly the guide peg 9 is introduced into a corresponding bore on the injection valve. In this way, it is assured that the bores for conduits passing through a plurality of components, for instance, are embodied in aligned fashion in the completely assembled fuel injector.

On the side facing away from the stop plate 4, the valve needle widens into a valve needle head 11. The valve needle head 11 is adjoined by a guide peg 12. The guide peg 12 is surrounded by a closing element 13, preferably embodied as a spiral spring. The closing element 13 is braced by one end against one end face 14 of the valve needle head 11 and by the other end against one end face 16 of an upper housing part 15. The guide peg 12 prevents the closing element 13 from being able to slip on the end face 14 of the valve needle head 11. The guide peg 12 also prevents the closing element 13 from kinking upon a stroke motion of the valve needle 3 out of the flat seat 7.

The valve body 2 and the upper housing part 15 are joined together by a lock nut 17.

The opening and closing operation of the valve needle 3 is controlled electromagnetically. To that end, a magnet cup 18 is located in the valve body 2 and has an annularly embodied groove, in which a coil 19 is received. The coil 19 is supplied with current via an electrical terminal 20. As soon as a voltage is fed to the coil 19, a magnetic field develops around the coil 19. By means of this magnetic field, the material comprising the magnet cup 18 is magnetized. This causes an armature 21, which is made of magnetic material and surrounds the valve needle head 11, to be attracted by the magnet cup 18. In this way, the valve needle 3 moves in the direction of the magnet cup 18 and thus uncovers the flat seat 7. In the process, the closing element 13 embodied as a spiral spring is compressed. The closing element 13 is located inside a bore 22 in the magnet cup 18, so that the magnet cup 18 surrounds the closing element 13.

The material comprising the magnet cup 18 is preferably a sintered metal, or contains fine iron particles sheathed in plastic that are compacted to make a magnet cup 18. This prevents eddy currents, which slow down the switching operation, from being created in the magnet cup. This material is extremely brittle and thus vulnerable to impacts. The impact of the valve needle 3 can therefore cause individual particles to break off from the magnet cup 18. As a result, the magnetic properties change. Furthermore, the broken-off particles can cause increased wear and thus can lead to the failure of the control valve 1. To absorb the shock load from the impact of the valve needle 3, a clamping sleeve 23 is received in the bore 22 in the magnet cup 18. The clamping sleeve 23 has a slot 24 extending between the face ends. The slot 24 serves to enable the clamping sleeve 23 to be press-fitted into the bore 22 in the magnet cup 18 with a defined spring force. The slot 24 makes it possible to insert the clamping sleeve 23 into the bore 22 with a prestressing force. For this reason, in the assembly of the clamping sleeve 23, no pressing forces need to be exerted on the magnet cup 18 as would be the case with a closed sleeve. Because of the high requisite pressing forces with closed sleeves, such sleeves can burst the magnet cup 18. This is avoided by the use of the clamping sleeve 23 of the invention, having the slot 24.

An adjusting ring 25 is located between the upper housing part 15 and the magnet cup 18, and the stroke of the valve needle 3 is adjusted by way of the thickness of this adjusting ring.

The clamping sleeve 23 is braced by one face end against the adjusting ring 25. In this way, the impact forces that act on the clamping sleeve 23 when the valve needle 3 hits it in the opening operation, are transmitted to the adjusting ring 25.

To prevent the clamping sleeve 23 from being magnetized by the coil 19 and thus being capable of affecting the switching operation of the valve needle 3, the clamping sleeve 23 is preferably made from a nonmagnetizable material. The material of the clamping sleeve 23 must also transmit the shock forces, which act on the clamping sleeve 23 when the valve needle 3 strikes it, to the adjusting ring 25, and it must not be damaged by these shock forces. For this reason, a carbon steel is preferably selected as the material for the clamping sleeve 23. Other suitable materials for the clamping sleeve are stainless steels, for example.

A second electrical terminal in the control valve 1 is identified by reference numeral 26. Via the second electrical terminal 26, a further valve in the fuel injector may for instance be supplied with current. The supply of current to the fuel injector is effected via the contacts 27.

Figure 2:
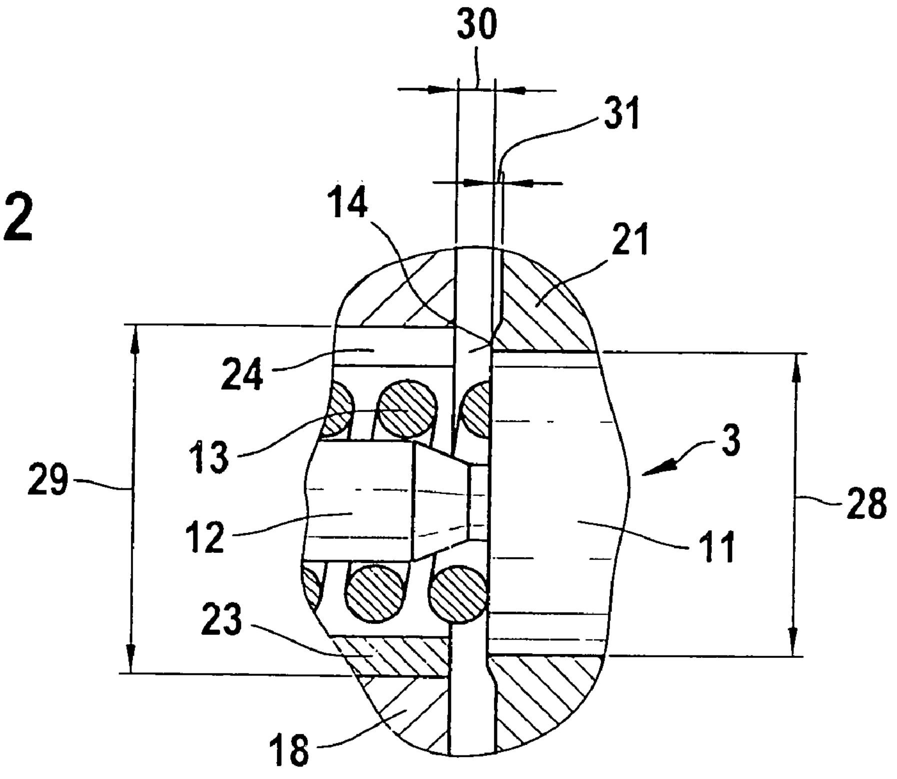
FIG. 2 shows a detail Z of FIG. 1.

FIG. 2 shows the detail Z of FIG. 1, from which it can be seen that the stop diameter 28 of the end face 14 of the valve needle head 11 is less than the outer diameter 29 of the clamping sleeve 23. This assures that the valve needle 3 will strike against only the clamping sleeve 23, and not against the magnet cup 18, since striking against the magnet cup 18 could cause the magnet cup to be damaged.

Upon opening of the valve needle 3, the stroke is limited by the striking of the end face 14 of the valve needle head 11 against the clamping sleeve 23. Upon closing, the stroke of the valve needle 3 is limited by the fact that the valve needle 3 is put into the flat seat 7, not shown in FIG. 2. The stroke of the valve needle 3 is represented by reference numeral 30.

To prevent the armature 21 from adhering to the magnet cup 18 when the valve is open, a remanent air gap 31 is provided. The adherence of the armature 21 to the magnet cup 18 results from the fact that, because of the small component size of the fuel injector, all the surfaces have only very slight roughness. For this reason, a thin fuel film between two surfaces has an adhesive effect.

The adjustment of the remanent air gap 31 is effected, in the fuel injector embodied according to the invention, in such a way that the valve needle head 11 protrudes out of the armature 21 by the height of the remanent air gap 31.

Figure 3:
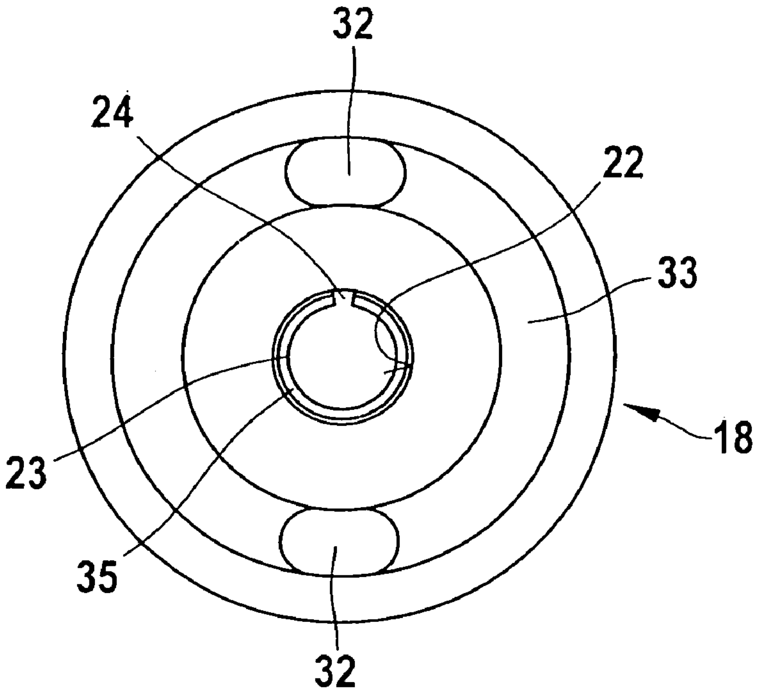
FIG. 3 is a plan view on the magnet cup with a clamping sleeve received in it.

FIG. 3 shows a plan view of a magnet cup with a clamping sleeve received in it.

The plan view on the magnet cup 18 shows that in it, at least one bore 32 is received, which discharges into an annular groove 33 for receiving the coil 19. In the embodiment shown in FIG. 3, two bores 32 are received in the magnet cup 18. The bores 32 serve to receive the electrical terminal 20, with which the coil 19 by which the magnetic field is generated is supplied, and for receiving the second electrical terminal 26, which is used for instance to supply current to a second valve in the fuel injector. The bore 22 is received in centered fashion in the magnet cup 18, which is preferably embodied with a circular cross section. The clamping sleeve 23 is located in the bore 22 and is pressed with a spring force against the wall of the bore 22. For bringing the spring force to bear, the slot 24 is embodied in the clamping sleeve 23, extending between the face ends of the clamping sleeve 23. The spring force is brought to bear by the fact that the clamping sleeve 23 is compressed, as a result of which the width of the slot 24 is reduced and the diameter of the clamping sleeve 23 is shortened. The thus prestressed clamping sleeve 23 is introduced into the bore 22. In the bore 22, the prestressing is absorbed by the clamping sleeve 23, so that the clamping sleeve opens to its original shape. This opening is interrupted by the wall of the bore 22, so that the clamping sleeve 23 is pressed against the wall of the bore 22 with a residual spring force. The residual force is great enough that jarring stress and the mass of the clamping sleeve 23 do not cause a release of the clamping sleeve 23. In this way, the clamping sleeve 23 is fixed (in a press fat) in the bore 22 of the magnet cup 18 as a result of the spring force.

Figure 4:
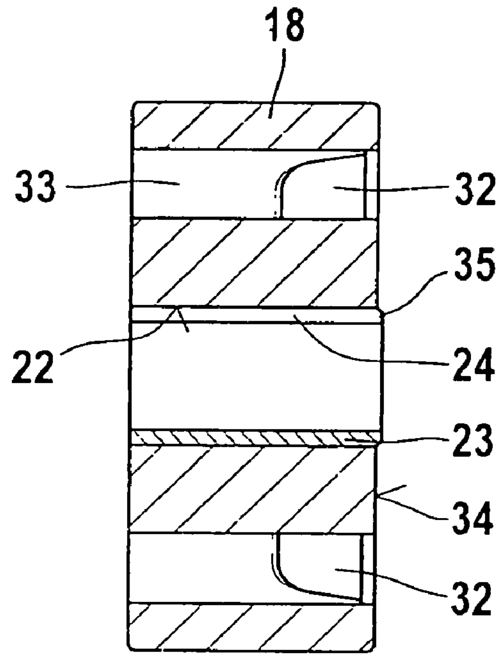
FIG. 4 is a section through a magnet cup with a clamping sleeve received in it, before the face ends are surface-ground.

FIG. 4 shows a magnet cup with a clamping sleeve received in it, before the concluding surface treatment. The annular groove 33 for receiving the coil 19 is located in the magnet cup 18. The annular groove 33 communicates with the bores 32, so that the coil 19 in the annular groove 33 can be supplied with current via the bore 32. This view shows that the clamping sleeve 23 protrudes out of the magnet cup 18, forming a protrusion 35. This shows the step in assembly when the clamping sleeve 23 is already inserted in the magnet cup 18, but the end face 34 of the magnet cup 18 has not yet been ground flat.

Figure 5:
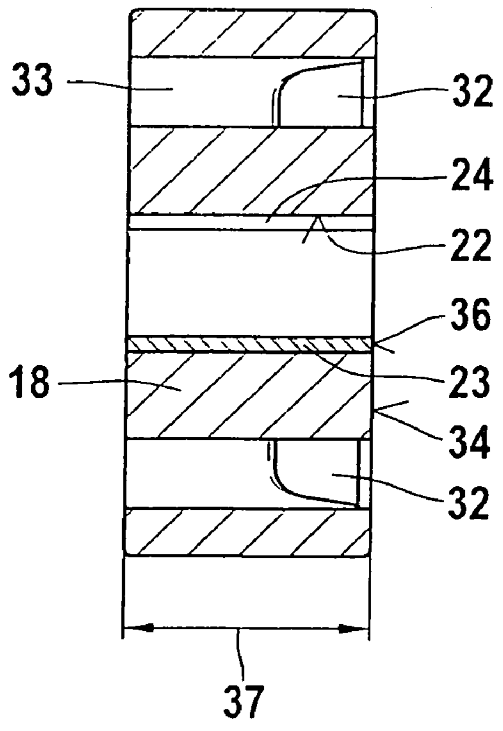
FIG. 5 is a section through a magnet cup with a clamping sleeve received in it, with surface-ground face ends.

FIG. 5 by comparison shows the magnet cup 18 with the clamping sleeve 23 inserted and with the surface-ground end face 34 of the magnet cup 18 and the surface-ground face end 36 of the clamping sleeve 23. The advantage of the assembly process in which the clamping sleeve 23 is first inserted into the magnet cup 18 and after that the magnet cup 18 and the clamping sleeve 23 inserted in it are brought to the same height 37 is that the components need not be paired. In other words, there is no need to take care that the height 37 of the magnet cup 18 and the length of the clamping sleeve 23 match exactly. As a result, during the production process, the clamping sleeve 23 need not be introduced into the magnet cup 18 repeatedly and taken out of it again for postmachining, since the machining is done of the two parts jointly. This makes economical assembly possible. Because of the joint grinding of the magnet cup 18 and clamping sleeve 23, an exactly plane surface 34, 36 is achieved.

In FIGS. 6.1, 6.2 and 6.3, various embodiments of the slots extending between the face ends are shown. FIG. 6.1 shows a slot 24 in the clamping sleeve 23 that extends in the axial direction between the face ends.

In FIG. 6.2, a slot 24 is shown that extends in a spiral around the clamping sleeve 23. The part of the slot 24 that is located on the side of the clamping sleeve 23 that projects into the plane of the drawing is represented by dashed lines. Besides the variant embodiment shown here, with a slot 24 extending all the way around the clamping sleeve 23 once, the slot 24 may also extend in the form of a spiral more than once around the clamping sleeve 23.

A further embodiment of the slot 24 is shown in FIG. 6.3. Here, the slot 24 extends in an arc on the clamping sleeve 23.

Besides the forms shown in FIGS. 6.1, 6.2 and 6.3, in which the slot 24 can extend between the face ends of the clamping sleeve 23, any other course known to one skilled in the art is also possible. In the embodiment of the slot 24, care must merely be taken that it extend between the face ends of the clamping sleeve 23.

To prevent the valve needle 3 from becoming tilted upon striking the clamping sleeve 23, the width of the slot 24, in a preferred embodiment, amounts to a maximum of 25% of the circumference of the clamping sleeve 23.

Figure 7:
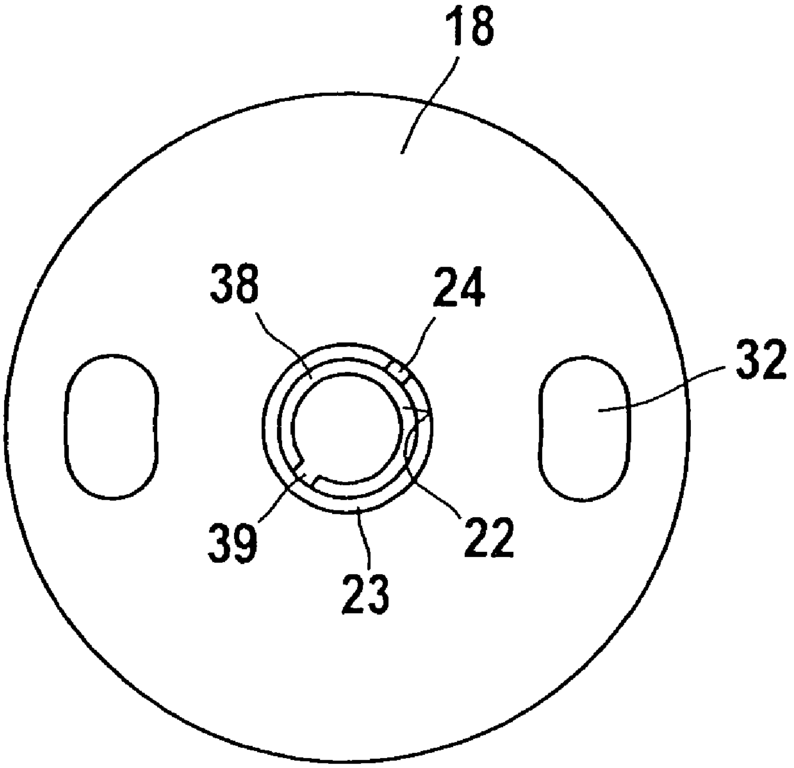
FIG. 7 is a plan view of a magnet cup with two clamping sleeves received in it.

A further possible way of preventing tilting of the valve needle 3 upon striking the clamping sleeve 23 is shown in FIG. 7. Here, a second clamping sleeve 38 is braced against the clamping sleeve 23 in the bore 22 in the magnet cup 18. The assembly of the second clamping sleeve 38 is done analogously to the assembly of the clamping sleeve 23. To prevent the valve needle 3 from tilting upon impact and to make a uniform stop face available, a slot 39 of the second clamping sleeve 38 is offset from the slot 24 of the clamping sleeve 23. This assures that the end face 14 of the valve needle head 11 will strike the clamping sleeves 23, 38 over its entire circumference.

It is also possible for more than two clamping sleeves 23, 38 to be used. In a preferred embodiment, the slots 24, 39 of the clamping sleeves 23, 38, when more than two clamping sleeves are used, are offset from one another in such a way that the slot of each clamping sleeve is located at a different position along the circumference.

The foregoing relates to preferred exemplary embodiments of the invention, it being understood that other variants and embodiments thereof are possible within the spirit and scope of the invention, the latter being defined by the appended claims.

I claim:

1. In a fuel injector for internal combustion engines, having a control valve (1) with an electromagnetically actuatable valve needle (3), in which a coil (19) is received in a magnet cup (18) made of magnetizable material, the valve needle (3) having a head (11) with an end face stop (14) at the end of the valve needle (3) facing the magnetic cup (18), at least one tubular clamping sleeve (23) received in the magnet cup (18), the tubular clamping sleeve (23) having a slot (24) extending between its face ends, wherein the diameter (28) of the end face stop (14) of the valve needle head (11) is less than the outer diameter (29) of the tubular clamping sleeve (23) and greater than the inner diameter of the tubular clamping sleeve (23) so that upon opening of the valve the valve needle (3) will strike against only the tubular clamping sleeve (23), and not against the magnet cup (18).

2. The fuel injector as recited in claim 1, wherein the tubular clamping sleeve (23) is braced by spring force against the wail of a bore (22) in the magnet cup (18).

3. The fuel injector as recited in claim 1, wherein the tubular clamping sleeve (23) is made from a nonmagnetizable material.

4. The fuel injector as recited in claim 2, wherein the tubular clamping sleeve (23) is made from a nonmagnetizable material.

5. The fuel injector as recited in claim 1, wherein the tubular clamping sleeve (23) is not deformed by the impact of the valve needle (3) upon opening of the valve.

6. The fuel injector as recited in claim 2, wherein the tubular clamping sleeve (23) is not deformed by the impact of the valve needle (3) upon opening of the valve.

7. The fuel injector as recited in claim 3, wherein the tubular clamping sleeve (23) is not deformed by the impact of the valve needle (3) upon opening of the valve.

8. The fuel injector as recited in claim 1, wherein the tubular clamping sleeve (23) surrounds a closing element (13).

9. The fuel injector as recited in claim 2, wherein the tubular clamping sleeve (23) surrounds a closing element (13).

10. The fuel injector as recited in claim 5, wherein the tubular clamping sleeve (23) surrounds a closing element (13).

11. The fuel injector as recited in claim 1, wherein the width of the slot (24) amounts to a maximum of 25% of the circumference of the tubular clamping sleeve (23).

12. The fuel injector as recited in claim 2, wherein the width of the slot (24) amounts to a maximum of 25% of the circumference of the tubular clamping sleeve (23).

13. The fuel injector as recited in claim 5, wherein the width of the slot (24) amounts to a maximum of 25% of the circumference of the tubular clamping sleeve (23).

14. The fuel injector as recited in claim 1, wherein the length of the tubular clamping sleeve (23) is equivalent to the height (37) of the magnet cup (18), so that face ends (34, 36) of the tubular clamping sleeve (23) and the magnet cup (18) form a smooth face.

15. The fuel injector as recited in claim 2, wherein the length of the tubular clamping sleeve (23) is equivalent to the height (37) of the magnet cup (18), so that face ends (34, 36) of the tubular clamping sleeve (23) and the magnet cup (18) form a smooth face.

16. In a fuel injector for internal combustion engines, having a control valve (1) with an electromagnetically actuatable valve needle (3), in which a coil (19) is received in a magnet cup (18) made of magnetizable material, the improvement comprising at least one clamping sleeve (23) received in the magnet cup (18), the clamping sleeve (23) having a slot (24) extending between its face ends, wherein at least two clamping sleeves (23, 38), whose slots (24, 39) are located at different radial positions, are received in the magnet cup (18).

17. A method for producing a fuel injector as recited in claim 1, comprising first press-fitted the tubular clamping sleeve (23) with spring prestressing into the magnet cup (18), and then grinding the magnet cup (18) together with the tubular clamping sleeve (23) to a height (37), in order to obtain flat end faces.

18. The method as recited in claim 17, wherein the force with which the tubular clamping sleeve is press-fitted into the magnet cup is dimensioned such that an expulsion force in the range of 100 to 500 N is required for releasing the tubular clamping sleeve.

* * * * *